Figures 1, 2:
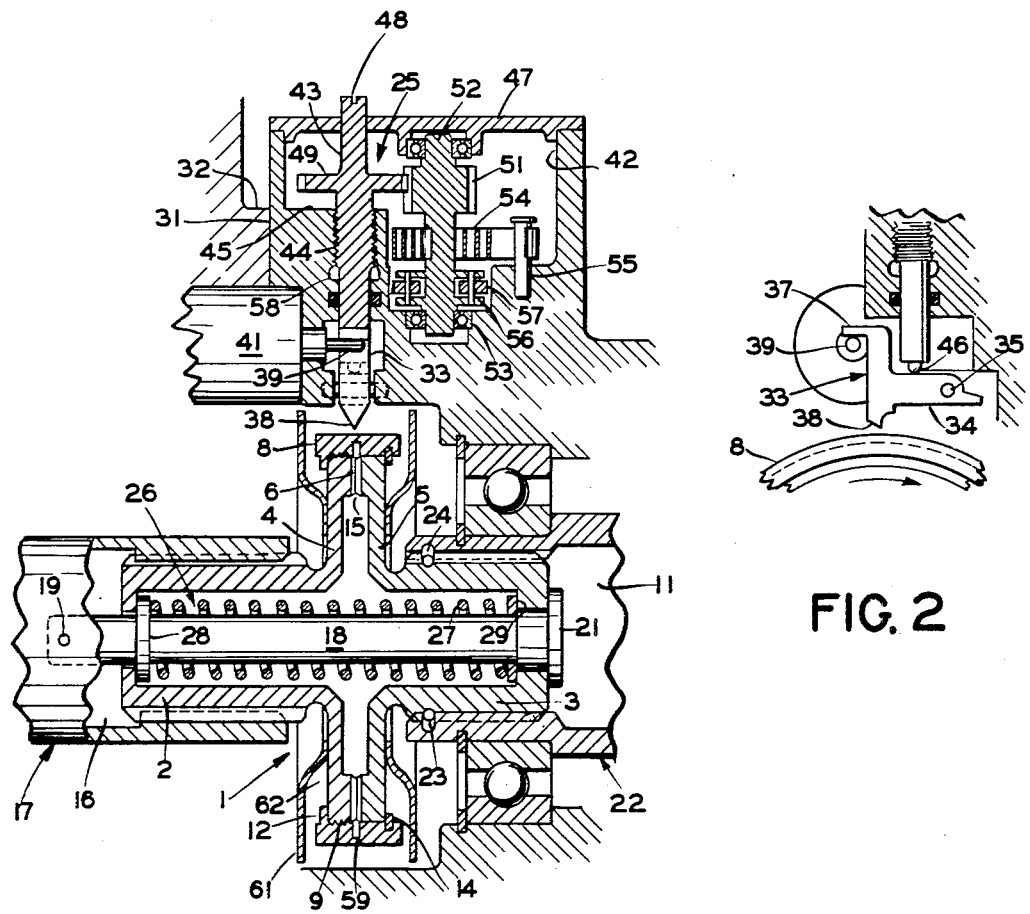

INVENTORS
HENRY TROEGER
BERNARD W. GOLDBERG
BY Nicholas J. Garafalo
ATTORNEY

United States Patent Office 2,727,371
Patented Dec. 20, 1955

2,727,371

EMERGENCY QUICK DISCONNECT AND UNCOUPLING MECHANISM

Henry Troeger, Ramsey, N. J., and Bernard W. Goldberg, Utica, N. Y., assignors to Bendix Aviation Corporation, Teterboro, N. J., a corporation of Delaware Application February 23, 1954, Serial No. 411,816

7 Claims. (Cl. 64—28)

This invention relates to quick disconnect and uncoupling mechanism which serves for coupling a driven member to a driving member and includes means for quickly disconnecting and uncoupling the one from the other when required.

The mechanism finds particular use in aircraft wherein it may be used to connect to a driving member a driven accessory device such as a pump, generator, transmission, supercharger, or other unit. At times, it becomes necessary in flight or otherwise, because of malfunctioning of an accessory or for other reasons to quickly disconnect the accessory from the engine power. Such accessory devices are customarily coupled to the engine quite securely to avoid vibration thereof or their dropping away, and are usually located at a point out of reach of the pilot. Means under immediate control of the pilot for quickly disconnecting such devices from the engine power in cases of emergency is therefore necessary and highly desirable.

Now, we have invented a novel mechanism that serves as a suitable means for coupling a driven accessory member to a driving member in an aircraft and which includes means subject to pilot control for quickly and effectively disconnecting the two members from one another in cases of emergency or for other reasons.

In general, the coupling of the present invention includes a driving element and a driven element joined together as a unit by a peripheral sleeve, and it provides means for quickly and effectively cutting the sleeve in two and thereby separating the driven from the driving element.

A feature of the invention is that the cutting means is subject to pilot control whereby the separation of an accessory from the engine load may be quickly executed.

A further feature of the invention lies in means for catching the cuttings during the cutting operation and preventing them from entering into the moving parts of the device and associated driving engine.

Another feature of the invention lies in governed means for automatically operating the cutter in response to action of the pilot to that end.

An object of the invention is, therefore, quick disconnect coupling mechanism, the function of which is to permit rapid disconnecting of a driven unit from its driving engine.

A further object of the invention is a device, useful in securely coupling a driven aircraft accessory to a driving member and including pilot controlled means for quickly and in a practical manner effectively disconnecting the one from the other.

Another object of the invention is new and useful improvements in quick disconnect coupling mechanism for rapidly and in a practical manner uncoupling a driven member from a driving member.

The invention further lies in the construction and particular arrangement of the various elements thereof as well as in their cooperative association with one another.

The foregoing and other objects and advantages of the invention will appear more fully hereinafter from a consideration of the detailed description which follows, taken together with the accompanying drawing wherein an embodiment of the invention is illustrated. It is to be expressly understood, however, that the drawing is for purposes of illustration and description, and is not to be construed as defining the limits of the invention.

Fig. 1 is a cross-sectional view of a quick disconnect coupling mechanism embodying the invention; and Fig. 2 is a detail side view of the cutter.

In describing the invention in further detail, reference is directed to the drawing wherein there is shown a coupling generally designated 1 including a pair of axially aligned hollow separate shaft members 2 and 3, each terminating in a flange of equal diameter. The flanges are respectively designated 4 and 5 and face oppositely one another. Flange 4 provides a slightly raised marginal face portion 6 in contact with a similar face portion of the opposed flange. The flanged elements are held together by a broad sleeve band 8 covering the adjacent peripheries of the flanges and retained thereon in suitable manner. Here, the periphery of one flange is threaded as at 9. The latter is engageable with a complementary threaded portion in the left half of sleeve 8. In uniting the two flanged portions, the threaded portion of the band is first secured upon the threaded flange until limited by a shoulder 12 of the band. The opposing flange 5 is slipped into the unthreaded right half portion of the band and a retaining ring 14 fitted into an overhanging groove of the band holds the flanges in abutting contact with one another. Face type splines 15 in the marginal face of one flange engage in complementary shallow splineways in the opposing flange face, whereby relative torsional movement of one flange with respect to the other is avoided.

Shaft member 2 and its associated flange piece 4 represent the left or driving half of the coupling, while shaft member 3 and its associated flange piece 5 represent the driven half of the coupling.

As previously stated, the coupling is adapted for use to transmit rotary motion from a driving engine to a driven unit. To this end, coupling shaft member 2 is splined about its periphery and slidably received in complementary splineways in a hollow end portion 16 of a drive shaft 17 associated with the engine. To prevent the coupling as a unit from slipping free of the hollow end of the drive shaft an elongated pin 18 extends axially through both halves of the coupling. The inner end of pin 18 is held fast in the drive shaft by a transverse pin 19 through the latter. The outer end of pin 18 carries a head 21 which limits against the outer end wall of the driven shaft member 3 of the coupling. The latter shaft member 3 is splined about its periphery and is slidably received in complementary splineways in a hollow end portion 11 of a shaft member 22 associated with a driven unit. The driven unit may be a pump, generator, or other accessory. Driven shaft 22 is prevented from slipping free of the coupling by a round snap ring 23 snapped in opposed annular channels 24 in the splines of the coupling shaft 3 and the driven shaft.

The purpose of the coupling is not only to transmit rotary motion from a driving engine to a driven unit, but also to permit a quick separation of the load of the driven unit from the driving engine in cases of emergency and the like. To this end, suitable means generally designated 25 is provided to cut through the periphery of the securing band 8 so as to release the separate halves of the coupling therefrom, and other means generally designated 26 is provided to spread the freed halves of the coupling away from one another. By this arrangement, the driving engine will be freed of the load of the driven accessory unit.

The spreading means 26 is contained within the hollow shaft portions 2 and 3 of the coupling. It comprises a coil spring 27 surrounding pin 18. The spring is compressed in the hollow shaft portions and is retained therein by end washers 28 limiting against interior end shoulders 29 of the coupling members 2 and 3.

The cutting means 25 is supported in a suitable housing 31 adapted to be mounted to a suitable supporting wall 32 of the engine body. The cutting of the band is executed by a parting tool 33 (Fig. 2) having a horizontally disposed body portion 34 pivoted at one end 35 in a slot of the housing. The forward end of the body portion includes a vertical cross-piece, the upper end of which carries an extended ear 37 and the lower end of which provides a cutting edge 38. The latter protrudes from a slotted bottom end of the housing above the peripheral center of band 8. The body portion 34 is prevented from pivoting the cutting edge 38 into contact with the band by ear 37 limiting upon a retractable locking pin 39. The locking pin is retractable by any suitable means. Here, a solenoid 41 when energized serves to retract the pin from under the ear to allow the cutting tool to pivot its cutting edge into contact with the surface of the band. The solenoid may be energized by a suitable switch, not shown, within reach of the pilot, or in other suitable manner.

Suitable pressure transmitting means is provided in the housing 31 to continuously bear upon the cutting tool so that the latter will cut progressively deeper into the band as the latter is carried about with the rotation of the coupling. To this end, there is provided in a chamber 42 of the housing an elongated vertical member 43 having a screw portion 44 that threads in a complementary threaded portion of a housing block piece 45. The lower end of the vertical member 43 extends out of the bottom of block piece 45 and carries a blunt nose or bead 46 (Fig. 2) which projects from the bottom end of the screw member and bears upon the upper surface of the body portion 34 of the cutting tool. The upper end of the screw member projects freely through a hole of a cover 47 of the housing and provides a screw driver slot 48 whereby the position of the nose end 46 may be adjusted relative to the body portion of the cutting tool.

Above the screw portion, member 43 carries a gear 49 which meshes with a gear 51 carried on a vertical elongated shaft of a spring loaded member 52. The latter is journaled at its ends in bearings 53. Below gear 51 and wound about the shaft is a spiral spring 54, connected at the inner end to the shaft and secured at the outer end upon a housing pin 55.

Screw member 43 is restrained against rotation under the power of spring 54 by the locked condition of the parting tool 33 against which it bears.

In the operation of the device, it can be seen that the rotating engine shaft 17 will drive the accessory unit 22 through the intermediate coupling 1. As the latter rotates, the peripheral center of the band piece 8 will be continuously carried beneath the cutting edge 38 of the parting tool.

Now, should the accessory unit begin to malfunction, or for some other reason it becomes necessary that the load thereof be quickly released from the driving engine, the pilot will energize solenoid 41. The latter thereupon acts to retract the locking pin 39 from beneath the ear 37 of the parting tool, whereupon the latter pivots down bringing the cutting edge 38 into contact with the peripheral center of the coupling band piece 8. Upon release of the parting tool, the screw member 43 is rotated under power of spring 54 to continuously bear down upon the parting tool. This action advances the cutting edge 38 steadily into the rotating band as it cuts until the band is parted in two. Screw 43 is controlled so as not to feed too rapidly by suitable retarding means carried on the lower end of the spring shaft. The retarding means may take the form of a conventional governor 56 having swingable weights 57 which will brake against the neighboring wall of the housing should the screw rotate too rapidly.

The screw is allowed to advance sufficiently to permit the band to be severed. It is limited in the extent of its movement by a shoulder 58 of the housing.

The band is preferably of a readily machineable material, such as brass. To further facilitate the cutting operation, the band is weakened about its peripheral center by an annular groove 59 in the inner face thereof.

As the band is severed in two, the tension of the coil spring 27 carried on pin 18 forces the driving half of the coupling away from the driven half by sliding shaft part 2 further into the hollow portion 16 of the driving engine 17. Following this action, the driving half of the coupling continues to rotate, released of the load of the malfunctioning driven unit.

It is to be further noted that shields 61 are provided by disc plates mounted on the outer faces of the coupling flanges. These plates flange out from the faces of the coupling to form annular pockets 62 and then extend vertical beyond the outer surface of the band piece 8 for a short distance. By this arrangement, protection is afforded to the coupling mechanism and other parts of the driving engine against flying particles of cuttings formed during the parting operation. During the parting operation, the cuttings thrown from the surface of the rotating band strike the extended shield portions 61 and are caused to drop into the annular pockets 62 for subsequent removal.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

We claim:

1. In the combination of a coupling unit including a part adapted for connection to a driving member, a separate part adapted for connection to a driven member, severable means uniting the two parts together for rotation as a unit, and controlled cutting means for severing the severable means and freeing the two parts from one another, wherein spring tensioned means is provided for holding the freed parts from one another.

2. A coupling unit comprising a part adapted for connection to a driving member, a separate part adapted for connection to a driven member, spring means contained partially within opposed hollow portions in each part constantly tensioning the separate parts away from one another, and severable means removably secured about both halves and holding the two parts together as a unit against the tension of the spring means.

3. A coupling unit comprising a part adapted for connection to a driving member, a separate part adapted for connection to a driven member, spring means contained partially within opposed hollow portions in each part and constantly tensioning the separate parts away from one another, and means uniting the two parts together for rotation as a unit comprising splines in an end wall face of one part received in splineways in an opposed end wall face of the other part, and a severable band removably secured about the opposed ends of both parts and serving to hold the splined faces together and to prevent separation thereof in an axial direction under tension of the spring means, and the splines serving to prevent torsional movement of one wall face relative to the other.

4. In combination with a coupling of the character described including a severable peripheral band securing a pair of opposed members of the coupling together for rotation as a unit, a cutting device for severing the peripheral band and comprising a cutting tool having a body portion pivoted at one end to a support and including a cutting edge depending from the opposite end, the cutting edge adapted to engage the peripheral band upon pivoting of the body portion, retractable pin means normally disabling the pivoting movement of the body portion, and solenoid control means for retracting the pin to permit pivoting of the body portion.

5. In combination with a coupling of the character described including a severable band securing a pair of opposed members of the coupling together for rotation as a unit, a cutting device for severing the peripheral band to free the opposed members of the coupling from one another, the cutting device comprising a cutting tool characterized by a broad body portion that is pivoted at one end to a support and includes a cutting edge depending from the opposite end above the band, the cutting edge adapted to engage the band upon pivoting of the body portion and to cut into the band as the latter is rotated continuously beneath the cutting edge, and spring loaded means constantly bearing upon said broad body portion to steadily feed the cutting edge into the band as the latter is rotated.

6. In a cutting device as in claim 5 wherein retractable pin means normally restrains the body portion from pivoting the cutting edge into contact with the band.

7. In a cutting device as in claim 5 wherein retractable pin means normally restrains the body portion from pivoting the cutting edge into contact with the band, and solenoid controlled means is provided for retracting the pin means to release the body portion for pivoting.

References Cited in the file of this patent

UNITED STATES PATENTS

| | | |
|---|---|---|
| 724,684 | Edwards | Apr. 7, 1903 |
| 953,118 | Boutell | Mar. 29, 1910 |
| 2,420,675 | Page | May 20, 1947 |